US012642728B2

(12) United States Patent
Grebenchtchikova

(10) Patent No.: US 12,642,728 B2
(45) Date of Patent: Jun. 2, 2026

(54) PATIENT ISOLATION DEVICE

(71) Applicant: Larissa Grebenchtchikova, Tucson, AZ (US)

(72) Inventor: Larissa Grebenchtchikova, Tucson, AZ (US)

( * ) Notice: Subject to any disclaimer, the term of this patent is extended or adjusted under 35 U.S.C. 154(b) by 759 days.

(21) Appl. No.: 18/007,242

(22) PCT Filed: Jul. 27, 2021

(86) PCT No.: PCT/US2021/071008
§ 371 (c)(1),
(2) Date: Jan. 27, 2023

(87) PCT Pub. No.: WO2022/027034
PCT Pub. Date: Feb. 3, 2022

(65) Prior Publication Data

US 2023/0263681 A1 Aug. 24, 2023

Related U.S. Application Data

(60) Provisional application No. 63/057,243, filed on Jul. 27, 2020.

(51) Int. Cl.
*A61G 10/00* (2006.01)
*A61G 10/02* (2006.01)
(Continued)

(52) U.S. Cl.
CPC ........... *A61G 10/005* (2013.01); *A61G 10/02* (2013.01)

(58) Field of Classification Search
CPC ....... A61G 10/005; A61G 10/02; A61B 90/40
See application file for complete search history.

(56) References Cited

U.S. PATENT DOCUMENTS 2,579,964 A * 12/1951 Reynolds ............... H05B 3/342 392/435
4,885,000 A 12/1989 Hogan
(Continued)

FOREIGN PATENT DOCUMENTS

EP 3607856 A1 2/2020

OTHER PUBLICATIONS

Phu, H-T, et al., Design and evaluation of a portable negative pressure hood with HEPA filtration to protect health care workers treating patients with transmissible respiratory infections, American Journal of Infection Control, Jun. 27, 2020, vol. 48, No. 10, pp. 1237-1243.

(Continued)

*Primary Examiner* — Carrie R Dorna
*Assistant Examiner* — Joshua Daryl D Lannu
(74) *Attorney, Agent, or Firm* — Hodgson Russ LLP

(57) ABSTRACT

The invention may be embodied as a patient isolation device. The patient isolation device may comprise a cover having a first lower surface having an interior edge and an exterior edge, a second lower surface having an interior edge and an exterior edge, an interior surface extending between the interior edges, and an exterior surface extending between the exterior edges. The interior surface may define a patient space within which a patient may be positioned. The exterior surface may be substantially parallel to the interior surface. One or more extensions may be configured to be disposed between a mattress of a hospital bed, each extending proximate a lower surface of the cover. At least a portion of the interior surface may be arc-shaped and configured to define a patient space within which a patient may be positioned.

25 Claims, 9 Drawing Sheets

(51) Int. Cl.
*B08B 15/02* (2006.01)
*F24F 8/108* (2021.01)

(56) References Cited

U.S. PATENT DOCUMENTS

| | | | |
|---|---|---|---|
| 5,342,121 | A | 8/1994 | Koria |
| 6,321,764 | B1 | 11/2001 | Gauger et al. |
| 7,507,249 | B2 | 3/2009 | Heaton et al. |
| 8,007,351 | B1 | 8/2011 | Maloney |
| 9,038,214 | B2 | 5/2015 | Hardin |
| 10,306,995 | B2 | 6/2019 | Swanson et al. |
| 2002/0087045 | A1 | 7/2002 | Chamorro-Perez et al. |
| 2004/0107984 | A1 | 6/2004 | Kline |
| 2004/0177447 | A1 | 9/2004 | Love |
| 2005/0004423 | A1 | 1/2005 | Shenosky et al. |
| 2005/0044630 | A1 | 3/2005 | Danaher |
| 2008/0020695 | A1* | 1/2008 | Chang .................. B08B 15/026 55/385.2 |
| 2014/0224288 | A1 | 8/2014 | Mear et al. |
| 2016/0115704 | A1 | 4/2016 | Burke |
| 2016/0136024 | A1 | 5/2016 | Poenisch et al. |
| 2017/0273844 | A1 | 9/2017 | Gillis |

OTHER PUBLICATIONS

Hung, O., et al., A simple negative-pressure protective barrier for extubation of COVID-19 patients, Canadian Journal of Anesthesia, May 21, 2020, vol. 67, pp. 1478-1480.
Fox, T.H., et al., Negative Pressure Tent to Reduce Exposure of Health Care Workers Q1 to SARS CoV-2 During Aerosol Generating Q2 Respiratory Therapies, Chest Journal, May 23, 2020, vol. 158, No. 4, p. 1331, 9 pages.

* cited by examiner

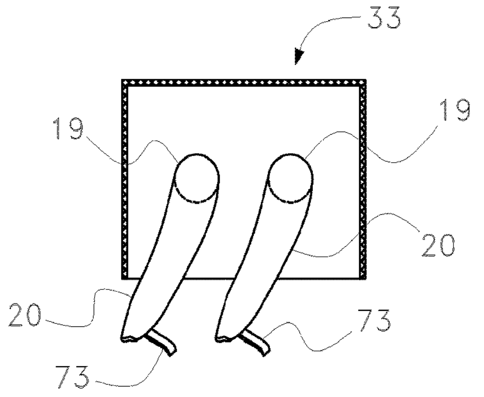
Fig. 4A
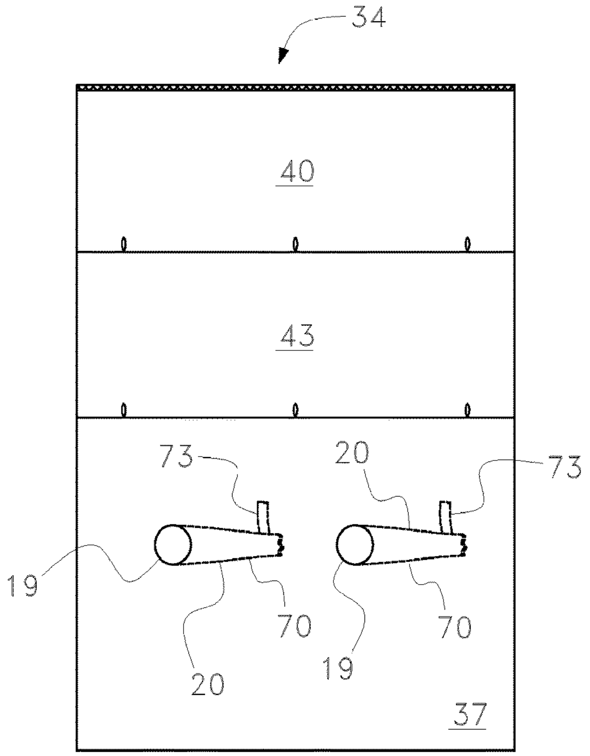
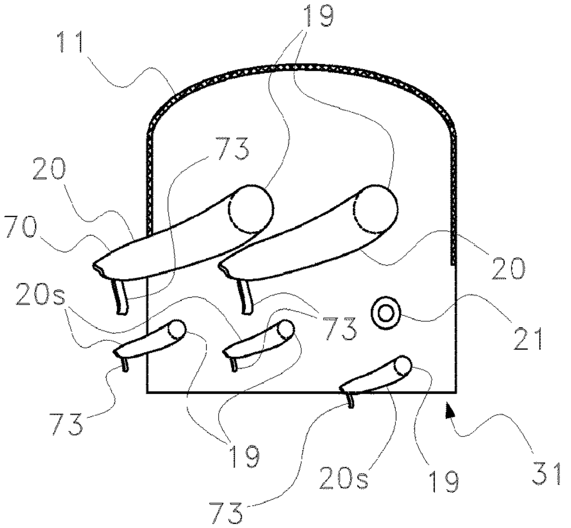
Fig. 4B
Fig. 4D

PATIENT ISOLATION DEVICE

CROSS-REFERENCE TO RELATED APPLICATION

This application claims the benefit of priority to PCT/US2021/071008 filed on Jul. 27, 2021, which claims priority to U.S. provisional patent application Ser. No. 63/057,243, filed on Jul. 27, 2020.

FIELD OF THE INVENTION

The present invention relates to devices and methods of isolating a patient.

BACKGROUND OF THE INVENTION

Infectious agents, such as COVID-19, are difficult to contain. As a result, patients that have an infectious agent ("IA") may need special care, and the health care workers attending to such patients need to be protected from such IAs. A particular difficulty arises when a patient needs to be moved from one location to another, or when a healthcare worker performs a procedure on such a patient: In such situations, the IA may aerosolize while moving the patient or while performing the procedure. Protecting health-care workers while a contagious patient is being moved or a procedure is being performed can be difficult using existing devices.

For example, some prior-art devices have openings that may allow the IA to escape, thereby putting health care workers at risk. U.S. Pub. No. 2002/0087045 ("US'045") is such device. The device of US'045 is open at the bottom, thereby allowing an IA to travel from the patient and through the space between the mattress and the walls 16, 18, 20, and 22. Further, access to the patient is via flaps 24, which must be opened to provide access to the patient, but at the risk of allowing even more IAs to escape. A further example is disclosed in U.S. Pub. No. 2016/0115704, which provides an opening 28.

The previously mentioned references have other disadvantages that are shared with other prior art devices. For example, U.S. Pub. No. 2014/0224288 ("US'288") discloses a device that precludes the patient from being on the mattress when the enclosure is installed. In US'288, the enclosure requires erecting the enclosure, placing the mattress within the enclosure, and then placing the patient within the enclosure, thereby precluding the enclosure from being installed while a patient is lying on the mattress. U.S. Pat. No. 6,321,764 has a similar problem in that it requires the placement of the flexible base 12 under the mattress before the patient can be placed on the mattress, and before the cover 14 can be placed over the patient. Such devices preclude installing the enclosure over a mattress that the patient is presently lying on. A further example is provided in U.S. Pat. No. 8,007,351.

Therefore, improved devices for isolating a patient are needed, and preferably these devices will inhibit the spread of IAs.

SUMMARY OF THE INVENTION

The invention may be embodied as a patient isolation device. The patient isolation device may comprise a cover having a first lower surface having an interior edge and an exterior edge, a second lower surface having an interior edge and an exterior edge, an interior surface extending between the interior edges, and an exterior surface extending between the exterior edges. The interior surface may define a patient space within which a patient may be positioned. The exterior surface may be substantially parallel to the interior surface.

At least a portion of the interior surface may be arc-shaped and configured to define a patient space within which a patient may be positioned. The cover may be translucent.

One or more extensions may be configured to be disposed between a mattress of a hospital bed, thereby fixing a position of the cover relative to the mattress, each extending from at least one of the first lower surface, the interior surface proximate to the first lower surface, the exterior surface proximate to the first lower surface, the second lower surface, the interior surface proximate to the second lower surface, or the exterior surface proximate to the second lower surface. Each extension may have a top surface substantially flush with one or more of the lower surfaces of the cover. Each extension may be configured to compress at least a portion of the mattress, thereby forming at least a partial seal between the patient cover and the mattress. The extensions may be sized and positioned to engage the interior edges against the mattress, to engage the exterior edges against the mattress, to engage the interior surface against the mattress, and/or to engage the lower surfaces against the mattress.

The patient isolation device may include a support structure supporting the cover. The support structure may comprise tubes. At least some of the tubes may be arc-shaped. At least some of the tubes may be mateable with each other to form the support structure.

The patient isolation device may comprise a head-piece enclosing a head-end of the cover. The head-piece may comprise a translucent material.

The patient isolation may comprise a head-piece extension extending from the head-piece, which may be configured to be disposed between the mattress and the hospital bed. The head-piece extension may be flexible and may be configured to have a biased resting state pointing generally toward the foot-piece. The head-piece extension may be sized and positioned to pull the interior edges against the mattress, and/or to pull the exterior edges against the mattress, and/or to pull the interior surface against the mattress, and/or to pull the lower surfaces against the mattress.

The patient isolation device may comprise a foot-piece enclosing a foot-end of the cover. The foot-piece may comprise a translucent material.

The patient isolation device may comprise a foot-piece extension extending from the foot-piece, which may be configured to be disposed between the mattress and the hospital bed. The foot-piece extension may be flexible and may be configured to have a biased resting state pointing generally toward the head-piece.

The foot-piece extension may be sized and positioned to pull the interior edges against the mattress, and/or to pull the exterior edges against the mattress, and/or to pull the interior surface against the mattress, and/or to pull the lower surfaces against the mattress.

The patient isolation device may have an access port provided in at least one of the cover, a head-piece enclosing a head-end of the cover, and a foot-piece enclosing a foot-end of the cover. The access port may be configured to receive a replaceable sleeve.

BRIEF DESCRIPTION OF THE DRAWINGS

For a fuller understanding of the nature and objects of the invention, reference should be made to the accompanying drawings and the subsequent description. Briefly, the drawings are:

FIG. 4A, which depicts a side-cover that is in keeping with a patient isolation device according to the invention;

FIG. 4B, which depicts a head-piece configuration that is in keeping with a patient isolation device according to the invention;

FIG. 4D, which depicts a side-cover that is in keeping with a patient isolation device according to the invention;

FURTHER DESCRIPTION OF THE INVENTION

Figure 1:
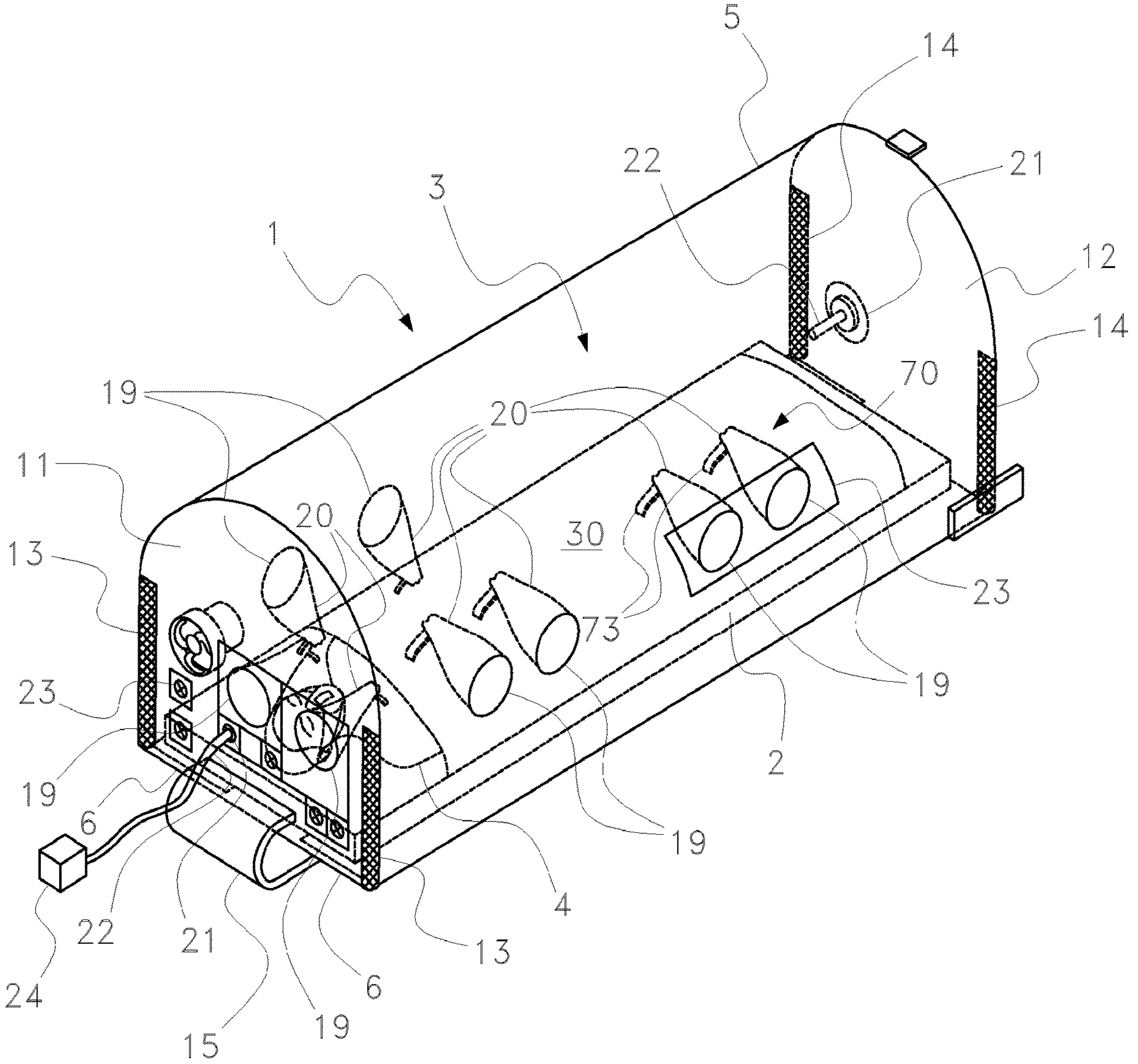
FIG. 1, which depicts a portion of a patient isolation device that is in keeping with the invention, and that is disposed on a mattress. Not shown in FIG. 1 is the support structure.

FIG. 1 depicts an embodiment of the invention having a patient cover 1, which quickly and easily engages with a mattress 2 of a hospital bed 3 that a patient 4 is lying on, thereby isolating the patient (and thus providing protection to health care workers) without the need to move the patient 4 from the mattress 2 on which the patient 4 is lying. The patient cover 1 may be made from a translucent and light-weight material, such as a plastic, which may be an acrylic material, so that two health-care workers can install the patient cover 1 over the patient 4 within a few minutes. In this manner, a patient may be isolated from healthcare workers without moving the patient from the mattress 2 of his/her hospital bed 3. The invention may allow the patient 4 to be moved via the hospital bed 3 from one location to another and may enable health-care workers to perform procedures on the patient 4. Such a patient cover 1 may, for example, be installed over a patient 4 within minutes of receiving test results indicating that the patient 4 has an IA.

In an embodiment of the invention, the patient cover 1 has some rigidity so as to resist forces applied from the outside in order to maintain the general shape of the patient cover 1. For example, the patient cover 1 may be made rigid enough to support portable medical equipment (e.g., a defibrillator) placed on top of the patient cover 1. Or, the patient cover 1 may be made rigid enough to enable a health care worker to use the patient cover 1 to provide leverage while administering a procedure to the patient 4.

In another embodiment of the invention, the patient cover 1 is flexible so as to allow the patient cover 1 to be manipulated and thereby afford the ability to move the patient 4 into areas where space is limited, such as when taking an x-ray or MRI of the patient 4.

Figure 3A:
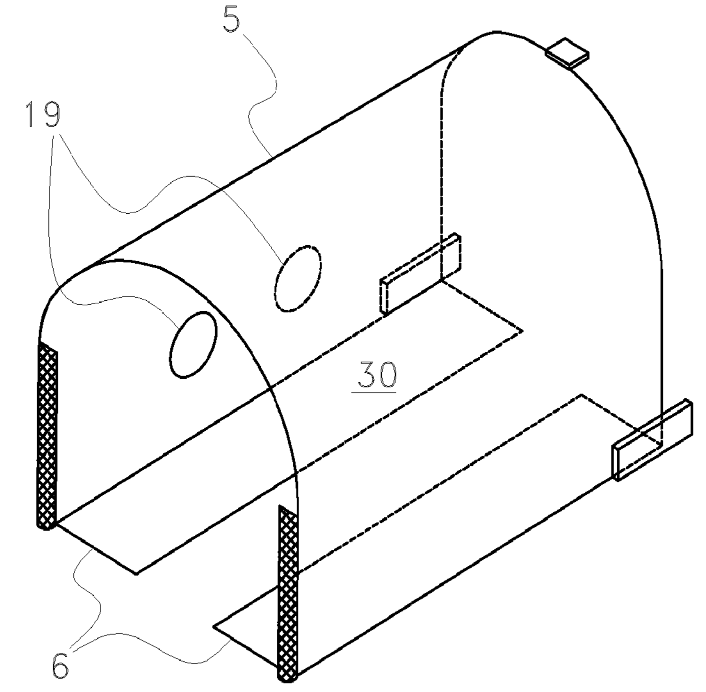
FIG. 3A, which depicts an arc-shaped cover that is in keeping with a patient isolation device according to the invention, including extensions that may be placed under a mattress.

In one embodiment of the invention, the patient cover 1 includes an arc-shaped cover ("ASC") 5, which may comprise a translucent material (e.g., a transparent thermoplastic such as acrylic), and which can be placed over a patient 4 that is positioned on a hospital bed 3. With reference to FIG. 3A, the ASC 5 may have extensions 6 on each side (left and right) of the ASC 5, and these extensions 6 can be placed under the mattress 2 of the hospital bed 3, thereby securing the ASC 5 relative to the mattress 2 on which the patient 4 is lying. In some embodiments of the invention, the extensions 6 may be fashioned to require compression of the mattress 2, so that lower edges 25 and 26 (see FIGS. 6A and 6B) of the ASC 5 are pulled into contact with the mattress 2, thereby restricting or preventing the flow of air and the IA from traveling between the mattress 2 and the ASC 5. The extensions may be secured in place merely via the force exerted by the compressed mattress, but there are other ways to secure the extensions. For example, the extensions may be secured to the bed (e.g. via snaps or a hook-and-loop fastener) that supports the mattress.

Figure 6A:
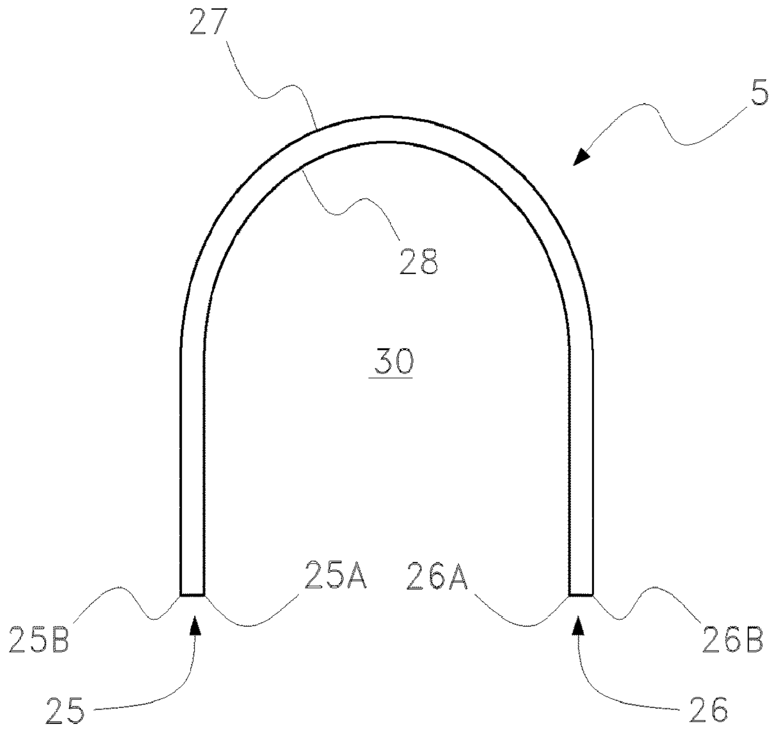
FIG. 6A, which depicts an end side of an arc-shaped cover that is in keeping with a patient isolation device according to the invention.
Figure 6B:
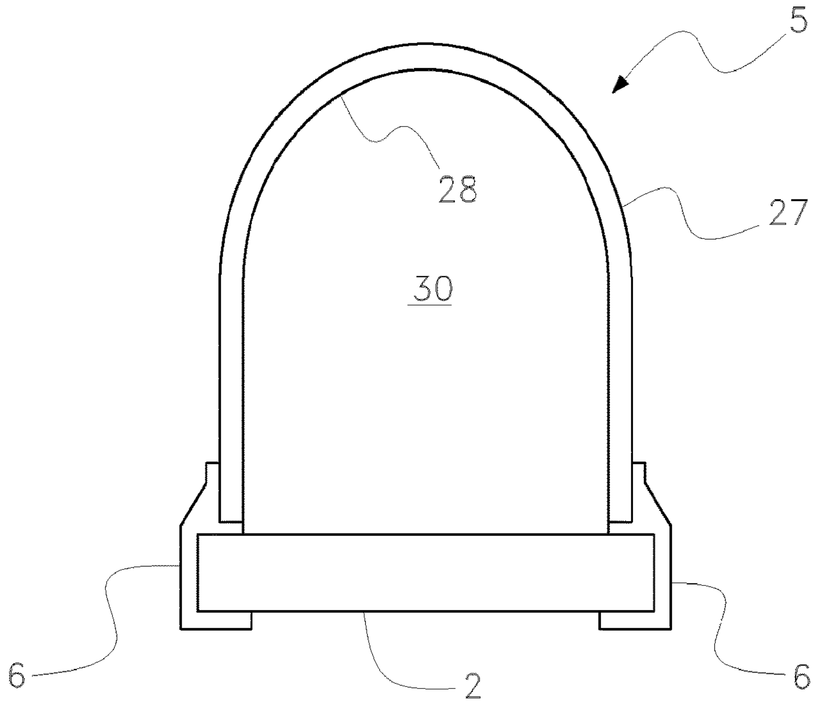
FIG. 6B, which depicts an end side of the arc-shaped cover of FIG. 6A while the cover is on a mattress.

With reference to FIGS. 3A and 6B, one or more extensions 6 may extend from a first lower surface 25, and/or a second lower surface 26, and/or the interior surface 28 proximate to the first lower surface 25 and/or the second lower surface 26, and/or the exterior surface 27 proximate to the first lower surface 25 and/or the second lower surface 26. FIG. 6B shows an arrangement in which the extensions 6 are attached to and extend from the lower surfaces 25, 26 as well as the exterior surface 27. Another arrangement might have a portion of an extension 6 being long enough to contact and be affixed to both the lower surfaces 25, 26 and/or the interior surface 28. One or more second extensions 6 may extend from the second lower surface 26 or the interior surface 28 proximate to the second lower surface 26, or the exterior surface 27 proximate to the second lower surface 26.

FIGS. 6A and 6B further depict an exterior surface 27 and an interior surface 28 of ASC 5. Exterior surface 27 may extend from first lower surface exterior edge 25B of first lower surface 25 to the second lower surface exterior edge 26B of second lower surface 26. Interior surface 28 may extend from the first lower surface interior edge 25A of first lower surface 25 to second lower surface interior edge 26A of second lower surface 26. The thickness of the ASC 5 may be substantially uniform so that the exterior surface 27 is substantially parallel to interior surface 28 at a particular location. An example of such an ASC 5 exhibiting an exterior surface 27 substantially parallel to an interior surface 28 may be a curved or formed sheet, for example, a curved or formed sheet of translucent plastic. In the examples depicted in FIGS. 6A and 6B the exterior surface 27 of the curved or formed sheet that composes ASC 5 may be substantially parallel to its interior surface 28.

Figure 2A:
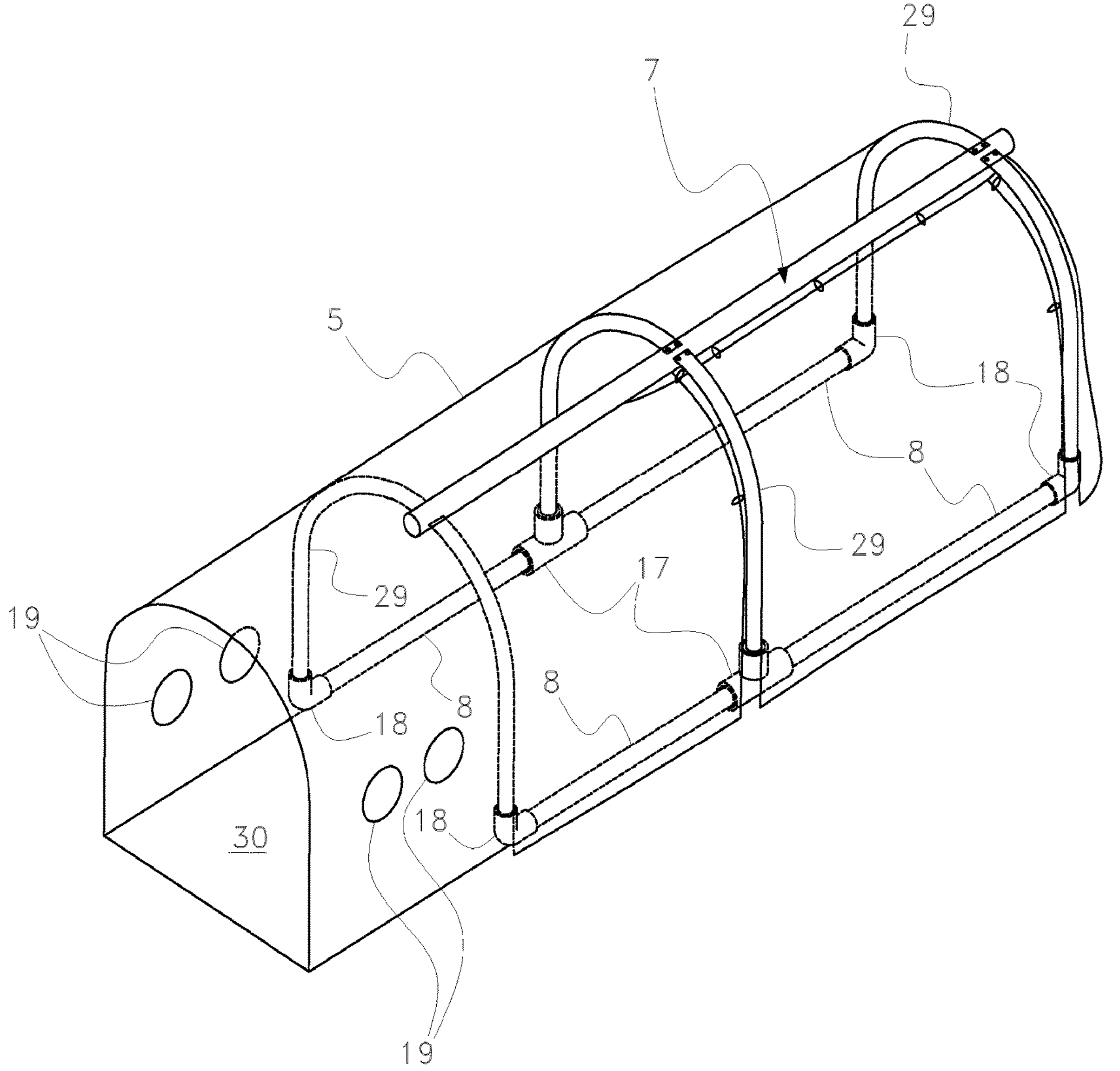
FIG. 2A, which depicts portions of a patient isolation device that is in keeping with the invention. Unlike FIG. 1, the support structure is shown.
Figure 5F:
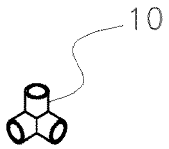
FIG. 5F, which depicts a corner joint for a support structure that is in keeping with a patient isolation device according to the invention.
Figure 5E:
FIG. 5E, which depicts an angle joint for a support structure that is in keeping with a patient isolation device according to the invention.
Figure 5D:
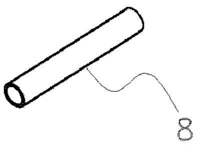
FIG. 5D, which depicts a straight section of a support structure that is in keeping with a patient isolation device according to the invention.

With reference to FIG. 2A, the ASC 5 may be supported by a support structure 7, and the support structure 7 may be made of a light-weight metal or plastic such as pipe made of polyvinylchloride. Such a support structure 7 may be comprised of small parts, for example, straight section 8, angle joint 9, and corner joint 10—see FIGS. 5D, 5E, and 5F, respectively, which mate with each other to form the support structure 7 comprised of interconnected pieces. By selecting a particular number of straight sections 8 and joining them together, ASCs 5 of differing lengths may be supported by the structure 7. In this manner, an ASC 5 that is sized for a young child may be supported by a structure 7 that is made from components similar to those used for a structure 7 that supports an ASC 5 that is sized for a large adult.

Figure 2B:
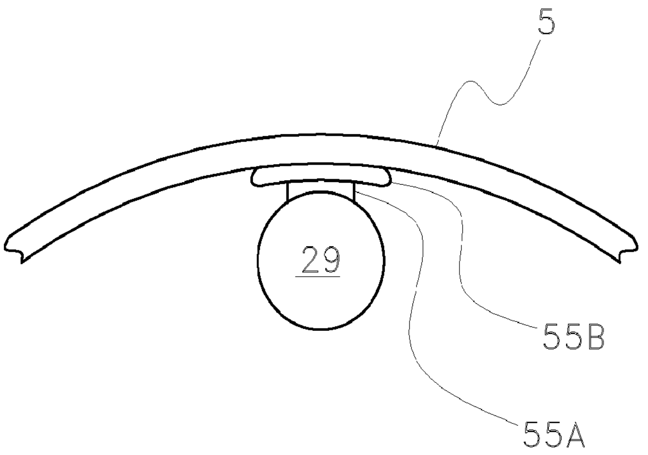
FIG. 2B, which depicts portions of a patient isolation device that is in keeping with the invention.

The ASC 5 may be secured to the support structure 7 in order to prevent or inhibit movement of the ACS 5 relative to the support structure 7. One manner of securing the ASC 5 to the support structure 7 is by using a hook-and-loop fastener such that one side 55A of the fastener is adhered to a support 29 and the other side 55B of the fastener is adhered to the ASC 5. FIG. 2B depicts such an arrangement. When the ASC 5 is lowered onto the structure 7, the two sides 55A, 55B of the hook-and-loop fastener engage with each other, thereby inhibiting the ASC 5 from moving relative to the support 29 of the support structure 7. The sides 55A, 55B may be rectangular in shape (each rectangle having a length and a width). The fastener 55A is shown in FIG. 2B adhered to the support 29 so that the length of fastener 55A extends generally parallel to the arced length of the support 29. FIG. 2B also shows the length of fastener 55B oriented substantially orthogonal to the length of the support 29, and in this manner the fasteners 55A, 55B may be more easily made to engage with each other when the ASC 5 is lowered onto the support structure 7.

Figure 2C:
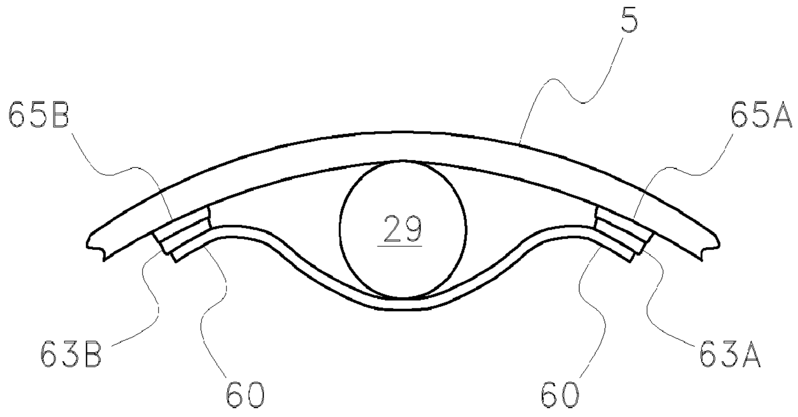
FIG. 2C, which depicts portions of a patient isolation device that is in keeping with the invention.

Another manner of securing the ASC 5 to the support structure 7 is by using a strip of fabric 60 (such as a nylon fabric) that is fastened to the ASC 5. FIG. 2C depicts such an arrangement. In FIG. 2C two hook-and-loop fasteners are shown being used to secure the fabric 60 to the ASC 5. In that arrangement, a portion 63A of one fastener is secured to an end of the fabric 60, such as via stitching the fabric 60 to the fastener portion 63A. And, a portion 63B of another fastener is secured to a different end of the fabric 60, such as via stitching the fabric 60 to the fastener portion 63B. Each of the fasteners 63A, 63B may engage with a mating portion 65A, 65B of the fasteners. The mating portions 65A, 65B are each attached to the ASC 5, for example, via an adhesive. By positioning the mating portions 65A, 65B of the fasteners so that a support 29 resides between, the strip of fabric 60 may be made to extend under the support 29. With the ends of the fabric 60 secured to the mating portions 65A, 65B via the portions 63A, 63B, the ASC 5 is inhibited from moving relative to the support 29.

Figure 5C:
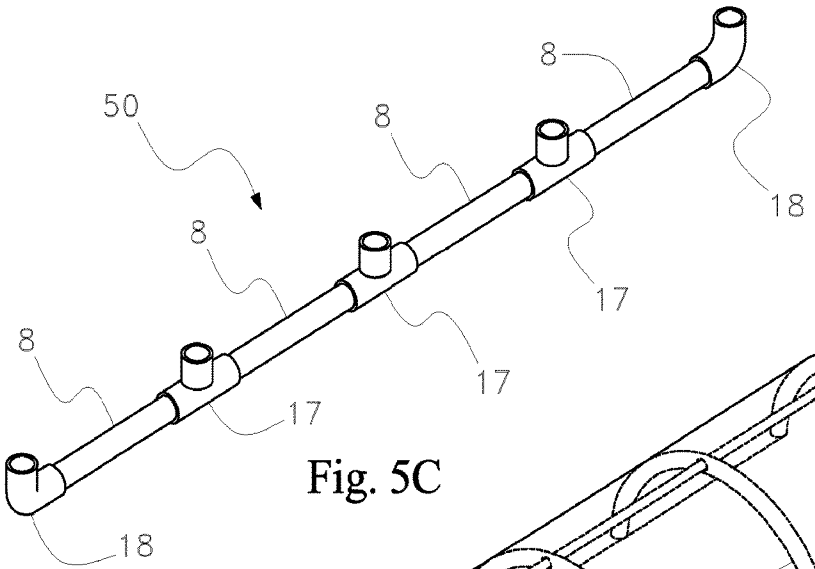
FIG. 5C, which depicts a base-portion of a support structure that is in keeping with a patient isolation device according to the invention.
Figure 5A:
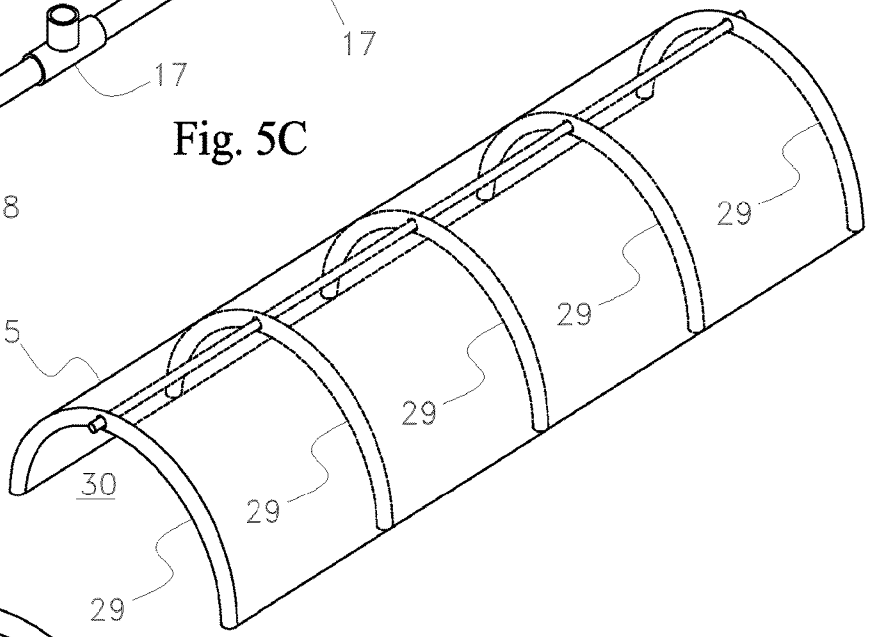
FIG. 5A, which is an isometric view of an example arc-shaped cover and a support structure that are in keeping with a patient isolation device according to the invention.
Figure 5B:
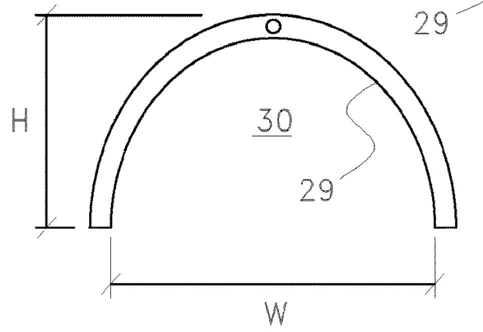
FIG. 5B, which is an end view of the arc-shaped cover and support structure of FIG. 5A.

FIGS. 5A and 5B are an isometric view and an end view, respectively, of a top portion of a support structure 7 having supports 29 and having an ASC 5 fitted to support structure 7. Supports 29 may be sized and/or shaped as needed to accommodate a given embodiment. For example, the length of supports 29 may be selected to be shorter or longer depending on the size of the ASC 5. More to the point, an ASC 5 that is sized for a young child may be supported by supports 29 that are shorter than supports 29 selected to support an ACS 5 that is sized for a large adult.

The supports 29 may be made from a flexible fiberglass cylinder, and may have a diameter that allows the supports 29 to be manually bent into the arced shape. FIG. 5A depicts five supports 29, but it should be noted that there may be a larger or lesser number of supports 29 comprising the support structure 7 depending on how many are needed to achieve a size and/or structural integrity to support the ASC 5.

The shape of the supports 29 may be selected to accommodate differing needs. As noted above, the shape may be a tube or a cylinder. However, the shape of the supports 29 may be semi-circular, semi-elliptical, parabolic, hyperbolic, polygonal with or without rounded/chamfered corners, or may be an irregular shape. The ASC 5 may be shaped to match the supports 29, or may have a different shape. Supports 29 may have a defined height "H" and width "W" (see FIG. 5B). For example, in an embodiment having semicircular supports 29, a height "H" may correspond to the radius of the supports 29 and a width "W" may correspond to a diameter of the support 29. The supports 29 may be joined to a base portion 50, such as the base portion 50 illustrated in FIG. 5C, to compose a patient cover 1. FIG. 5C depicts a base portion 50 of the support structure 7 having straight sections 8, tee joints 17, and elbow joints 18. The connection between the supports 29 and two base portions may be made by fitting ends of each support 29 into different base portions 50, for example into the open ends of tee joints 17 or elbow joints 18.

The parts that comprise the support structure 7 may connect with each other, for example via spring-loaded knobs on one part that extend into and through holes on a corresponding mating part. In this manner, the relatively large ASC 5 may be supported over the patient 4, and via the support structure 7 the ASC 5 might be made stable enough to provide a surface against which health-care workers might lean while performing actions beneficial to the patient 4, or on which medical equipment can be placed without compromising the patient space 30 created by the ASC 5 in which the patient 4 resides.

In some situations, it may be advantageous for the ASC 5 to be flexible, rather than rigid. In such an embodiment of the invention, the ASC 5 may be a flexible material such as a translucent vinyl less than 2 mm thick. The corresponding support structure 7 may be relatively rigid and not adjustable, for example by making the supports 29 from a flexible fiberglass. Or, the corresponding support structure 7 may be both flexible (e.g. supports 29 being made from a flexible material) and/or adjustable in height. Height adjustment may be accomplished by selecting supports 29 having desired lengths. A flexible support structure 7 may comprise supports 29 that may elastically deform in order to make the profile of the flexible ASC 5 fit into a small space, or allow the ASC 5 to be pushed closer to the patient. In this manner, a flexible support structure 7 and flexible ASC 5 may be configured to elastically deform as necessary to manipulate or maneuver the patient cover 7 in order to accommodate changing needs and environments.

In an embodiment where the support structure 7 is rigid and the ASC 5 is flexible, the support structure 7 may be equipped with the ability to be raised and lowered, so that the ASC 5 may be located at different heights above the patient. Such a support structure 7 may, for example, comprise vertical telescopic sections, enabling their extension or retraction and thus the raising or lowering of a height of the support structure 7 (i.e., adjusting the distance separating the point of maximum concavity of the inner surface of ASC 5 from the mattress). In such an embodiment, the support structure 7 may be raised to accommodate large patients, lowered to accommodate small patients, raised to accommodate a procedure, or lowered to accommodate providing medical care within a confined and narrow space. For example, an adjustable support structure 7 combined with a flexible ASC 5 may allow the ASC 5 to be positioned above the patient 4 so as to accommodate possible claustrophobic tendencies of the patient 4, but lowered when it is necessary to position x-ray equipment near the patient 4 in order to obtain a proper image.

Figure 3B:
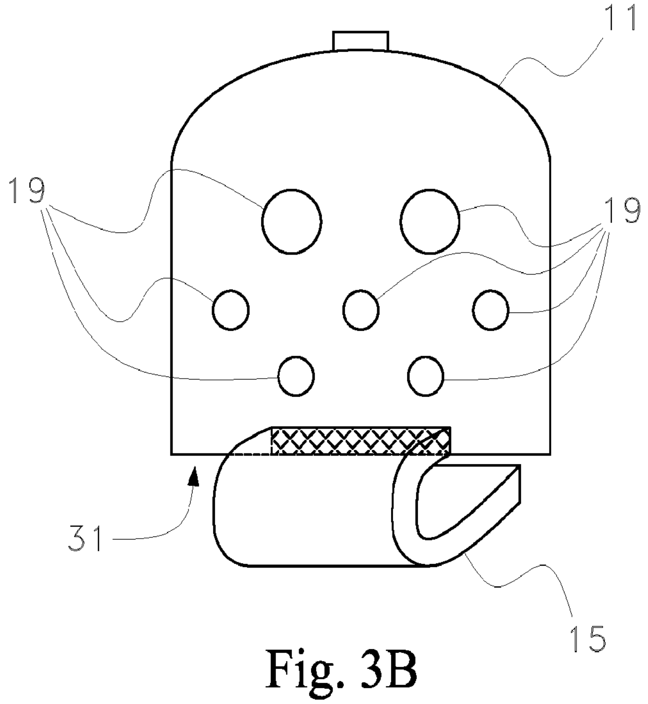
FIG. 3B, which depicts a head-piece that is in keeping with a patient isolation device according to the invention.
Figure 3C:
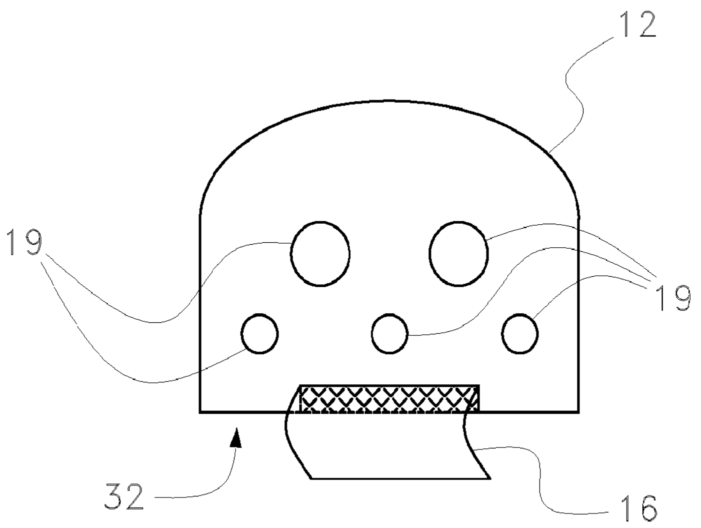
FIG. 3C, which depicts a foot-piece that is in keeping with a patient isolation device according to the invention.

FIG. 3B depicts a head-piece 11, which may be made from the same translucent material as the ASC 5, may be attached to the ASC 5 to enclose one end of the ASC 5 near the patient's 4 head. FIG. 3C depicts a foot-piece 12, which may be made from the same translucent material, may be attached to the ASC 5 to enclose another end of the ASC 5 near the patient's 4 feet. The connections 13 and 14 (e.g. see FIG. 1) between the head-piece 11 and/or foot-piece 12, respectively, to the ASC 5 may be via a zipper, hook-and-loop, or a tongue-and-groove arrangement, which may be sealed by placing cover-patches over the zipper, hook-and-loop, or tongue-and-groove, as the case may be.

A tongue-and-groove arrangement may be accomplished by using a flexible plastic extension providing a groove. The flexible plastic extension may be adhered to the ASC 5, and a leading edge of the other component (the head-piece 11 and/or the foot-piece 12) may be fitted into the groove provided by the flexible plastic extension. The arrangement of the flexible plastic extension may be reversed so that a leading edge of the ASC 5 may be fitted into the groove provided by the flexible plastic extension, which is adhered to the head-piece 11 and/or the foot-piece 12.

Figure 7:
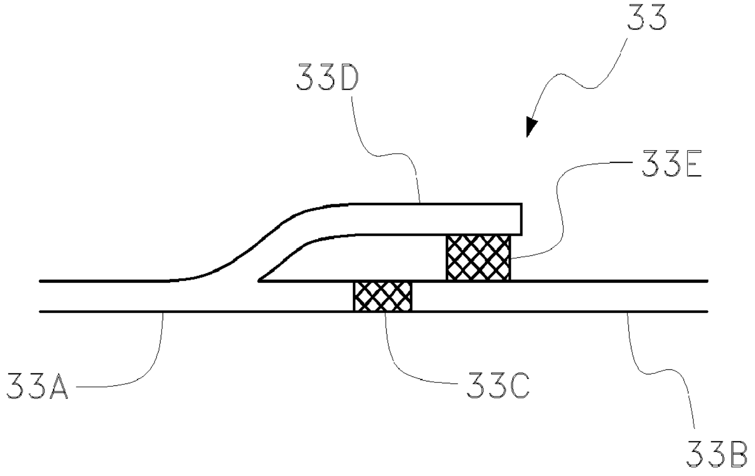
FIG. 7, which depicts a cross section of a representative connection having a cover patch between two portions of a patient isolation device according to the invention.

FIG. 7 depicts a representative connection 33, which may be representative of connections 13 and 14 between head-piece 11 and/or foot-piece 12, respectively, to the ASC 5. Representative connection 33 may comprise a first connected portion 33A connected to second connected portion 33B via connection means 33C. Connection means 33C may comprise, for example, a zipper, hook-and-loop, or a tongue-and-groove arrangement. Cover-patch 33D, integral or otherwise attached to the first connected portion 33A may fold over or otherwise cover connection means 33C and attach to the second connected portion 33B by an attachment means 33E, thereby sealing the representative connection 33. Attachment means 33E may comprise, for example, a hook-and-loop fastener, zipper, or pressure sensitive adhesive.

The head-piece 11 and/or foot-piece 12 may have extensions 15 and 16, respectively (see FIGS. 3A, 3B), that can be tucked under the mattress 2, and thereby secure each of the head-piece 11 and/or foot-piece 12 relative to the mattress 2. The extensions 15 and 16 may be positioned relative to a lower edge 31 and/or 32 of the head-piece 11 and/or foot-piece 12, respectively, so that when the extensions 15 and 16 are tucked under the mattress 2, the lower edge 31 and/or 32 of the head-piece 11 and/or foot-piece 12, respectively, is pulled into the mattress 2, thereby providing somewhat of a seal between the mattress 2 and the ASC 5 so as to inhibit the passage of air and the IA.

The head-piece 11, the foot-piece 12, and/or the ASC 5 may include access ports 19, and these access ports 19 may be paired with flexible sleeves 20. The flexible sleeves 20 may extend into the patient space 30, thereby enabling health care workers to access the patient 4. When in use, a healthcare worker may extend her hands into the flexible sleeves 20 toward the patient 4. The flexible sleeves 20 may be wide near the ASC 5 and narrow at a location distal from the ASC 5, and as such, the flexible sleeves 20 may conform generally to the shape and accommodate movement of the human arm. A distal end 70 of each flexible sleeve 20 may be fitted with an elastic opening sized to engage gloves, which may be tight-fitting and worn by the healthcare worker who is administering a medical procedure. Alternatively, the sleeves 20 may be fitted with a tab 73 at the distal end 70. The tab may have a pressure sensitive adhesive so as to allow the tab 70 to be selectively adhered to a location on the distal end 70 so that the sleeve fits snuggly against the healthcare worker's gloves. In this manner, the flexible sleeves 20 may enable the healthcare worker to move her arms within the ASC 5 to position her gloves at a location where she may undertake a medical procedure required by the patient 4, while also limiting the ability of an IA escaping from the ASC 5. Smaller sleeves 20*s* may be used in conjunction with cables and/or tubing that extend into the patient space 30, for example to facilitate medical equipment residing in the patient space 30 or procedures being carried out within the patient space 30.

Figure 4C:
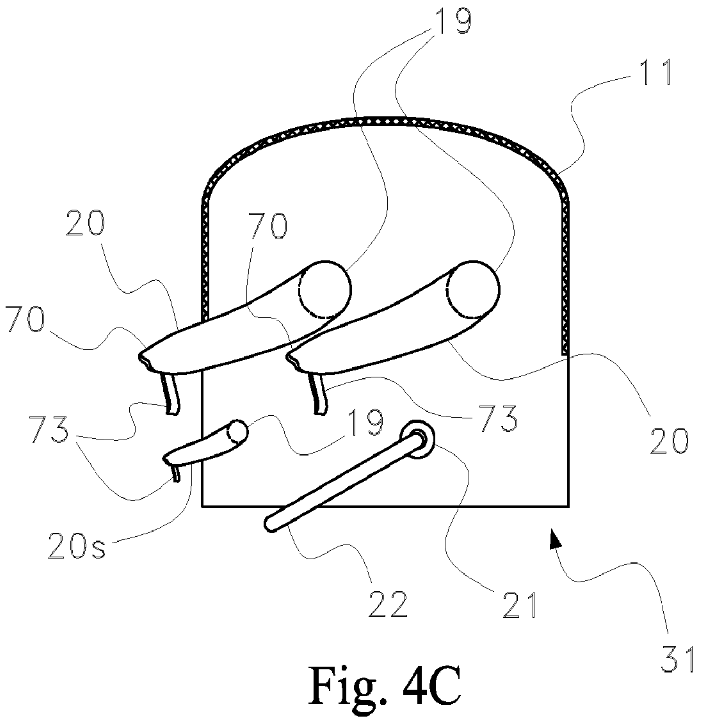
FIG. 4C, which depicts a head-piece configuration that is in keeping with a patient isolation device according to the invention.

Flexible sleeves 20 may be configured to be replaceable. In one embodiment, a flexible sleeve 20 may be configured to be selectively attached to or detached from the ASC 5 in the vicinity of an access port 19. In another embodiment, one or more flexible sleeves 20 may be configured to be attached to a removable flexible sleeve panel, such as removable flexible sleeve panels 33 and 34 depicted in FIGS. 4A and 4D. Flexible sleeve panels 33 and 34 may be attached to the ASC 5 via, for example, a pressure-sensitive adhesive, or a hook and loop fastener. With reference to FIG. 4A, removable flexible sleeve panel 33 may be configured to attach to a substantially flat surface of head-piece 11, a foot-piece 12, or a portion of an ASC 5. With reference to FIG. 4D, removable flexible sleeve panel 34 may be configured to attach to an external surface of a portion of an ASC 5. Removable flexible sleeve panels 34 may enable the installation or removal of multiple flexible sleeves 20 at once without needing to disassemble the patient cover 1 or completely remove the ASC 5, head-piece 11, or foot-piece 12.

With reference to FIG. 4D, the panel 34 may include panel portions 37, 40, 43. By lowering the top panel portion 40, middle panel portion 43 may be made to cover at least part of the lower panel portion 37, including the access ports 19, while still allowing a medical professional to reach the flexible sleeves 20. In this manner, the atmosphere within the cover 1 may be further isolated, thereby protecting those outside the cover 1 from IAs inside.

The access ports 19 may be sealed when not in use. To seal the access ports, a seal cover 23 (two of which are shown in FIG. 1) may be attached to the ASC 5 in order to cover the access port 19, and thereby prevent an IA from leaving the space 30 via the access port 19. For example, the seal cover 23 may be a flexible piece of plastic that is attached to the ASC 5 via a pressure-sensitive adhesive. Such pressure-sensitive adhesives may include elastomer-based pressure-sensitive adhesives.

In addition, the ASC 5, head-piece 11, and/or foot-piece 12 may have one or more scalable openings 21, which may accommodate tubing 22 associated with medical equipment 24, for example, medical equipment 24 that facilitates movement of air into and/or out of the patient space 30 that has been created by the patient cover 1. Medical equipment 24 that facilitates movement of air into and/or out of the patient space 30 may include an oxygen supply 24A and a filter 24B. For example, the filter 24A may be a HEPA filter. The oxygen supply 24A may be controlled to provide adequate supply of oxygen to the patient. The medical equipment 24 may include pressure sensors 24C and related controllers 24D to achieve removal of gas from the space 30 at a rate that creates a pressure within the space 30 that is lower than the pressure outside the cover 23. The filter 24B may remove or reduce IAs from the gas passing out of the space 30.

Now that features of the invention and some embodiments of the invention have been described, an outline (non-limiting) of various embodiments of the invention is stated as follows:

A1. A patient isolation device, comprising:
 a cover having:
  (a) a first lower surface having an interior edge and an exterior edge;
  (b) a second lower surface having an interior edge and an exterior edge;
  (c) an interior surface extending between the interior edges;
  (d) an exterior surface extending between the exterior edges; and
  wherein the interior surface at least partially defines a patient space within which a patient may be positioned; and
  wherein the exterior surface is substantially parallel to the interior surface; and
 one or more extensions configured to be disposed between a mattress and a hospital bed, thereby fixing a position of the cover relative to the mattress, each extension extending from at least one of the following:
  the first lower surface;
  the interior surface proximate to the first lower surface;
  the exterior surface proximate to the first lower surface;
  the second lower surface;
  the interior surface proximate to the second lower surface; and
  the exterior surface proximate to the second lower surface.

A2. The patient isolation device of Statement A1, wherein at least a portion of the interior surface is arc-shaped and configured to define the patient space within which the patient may be positioned.

A3. The patient isolation device of any of Statements A1 to A2, wherein the cover is translucent.

A4. The patient isolation device of any of Statements A1 to A3, further comprising a support structure supporting the cover.

A5. The patient isolation device of Statement A4, wherein the support structure comprises tubes.

A6. The patient isolation device of Statement A5, wherein at least some of the tubes are arc-shaped.

A7. The patient isolation device of any of Statements A5 to A6, wherein at least some of the tubes are mateable with each other to form the support structure.

A8. The patient isolation device of any of Statements A1 to A7, wherein each extension has a top surface substantially flush with one or more of the lower surfaces of the cover.

A9. The patient isolation device of any of Statements A1 to A8, wherein each extension is configured to compress at least a portion of the mattress, thereby forming at least a partial seal between the cover and the mattress.

A10. The patient isolation device of any of Statements A1 to A9, wherein the extensions are sized and positioned to engage the interior edges against the mattress.

A11. The patient isolation device of any of Statements A1 to A10, wherein the extensions are sized and positioned to engage the exterior edges against the mattress.

A12. The patient isolation device of any of Statements A1 to A11, wherein the extensions are sized and positioned to engage the interior surface against the mattress.

A13. The patient isolation device of any of Statements A1 to A12, wherein the extensions are sized and positioned to engage the lower surfaces against the mattress.

A14. The patient isolation device of any of Statements A1 to A13, further comprising a head-piece enclosing a head-end of the cover.

A15. The patient isolation device of Statement A14, wherein the head-piece comprises a translucent material.

A16. The patient isolation device of any of Statements A14 to A15, further comprising a head-piece extension extending from the head-piece configured to be disposed between the mattress and the hospital bed.

A17. The patient isolation device of Statement A16, wherein the head-piece extension is flexible and configured to have a biased resting state pointing generally toward the foot-piece.

A18. The patient isolation device of any of Statements A16 to A17, wherein the head-piece extension is sized and positioned to pull interior edges of the head-piece against the mattress.

A19. The patient isolation device of any of Statements A16 to A18, wherein the head-piece extension is sized and positioned to pull the exterior edges against the mattress.

A20. The patient isolation device of any of Statements A16 to A19, wherein the head-piece extension is sized and positioned to pull the interior surface against the mattress.

A21. The patient isolation device of any of Statements A16 to A20, wherein the head-piece extension is sized and positioned to pull the lower surfaces against the mattress.

A22. The patient isolation device of any of Statements A1 to A21, further comprising a foot-piece enclosing a foot-end of the cover.

A23. The patient isolation device of Statement A22, wherein the foot-piece comprises a translucent material.

A24. The patient isolation device of any of Statements A22 to A23, further comprising a foot-piece extension extending from the foot-piece configured to be disposed between the mattress and the hospital bed.

A25. The patient isolation device of Statement A24, wherein the foot-piece extension is flexible and configured to have a biased resting state pointing generally toward the head-piece.

A26. The patient isolation device of any of Statements A24 to A25, wherein the foot-piece extension is sized and positioned to pull interior edges of the foot-piece against the mattress.

A27. The patient isolation device of any of Statements A24 to A26, wherein the foot-piece extension is sized and positioned to pull the exterior edges against the mattress.

A28. The patient isolation device of any of Statements A24 to A27, wherein the foot-piece extension is sized and positioned to pull the interior surface against the mattress.

A29. The patient isolation device of any of Statements A24 to A28, wherein the foot-piece extension is sized and positioned to pull the lower surfaces against the mattress.

A30. The patient isolation device of any of Statements A1 to A29, further comprising an access port provided in at least one of the cover, a head-piece enclosing a head-end of the cover, or a foot-piece enclosing a foot-end of the cover.

A31. The patient isolation device of Statement A30, wherein the access port is configured to receive a replaceable sleeve.

A32. A patient isolation device, comprising:
a cover having:
(a) a first lower surface having an interior edge and an exterior edge;
(b) a second lower surface having an interior edge and an exterior edge;
(c) an interior surface extending between the interior edges;
(d) an exterior surface extending between the exterior edges; and
wherein at least a portion of the interior surface is arc-shaped and configured to at least partially define a patient space within which a patient may be positioned; and
wherein the exterior surface is substantially parallel to the interior surface.

A33. The patient isolation device of Statement A32, further comprising one or more extensions configured to be disposed between a mattress and a hospital bed, thereby fixing a position of the cover relative to the mattress, each extending from at least one of the following:
the first lower surface;
the interior surface proximate to the first lower surface;
the exterior surface proximate to the first lower surface;
the second lower surface;
the interior surface proximate to the second lower surface; and
the exterior surface proximate to the second lower surface.

A34. The patient isolation device of Statement A33, wherein each extension has a top surface substantially flush with one or more of the lower surfaces of the cover.

A35. The patient isolation device of any of Statements A33 to A34, wherein each extension is configured to compress at least a portion of the mattress, thereby forming at least a partial seal between the cover and the mattress.

A36. The patient isolation device of any of Statements A33 to A35, wherein the extensions are sized and positioned to engage at least some of the interior edges against the mattress.

A37. The patient isolation device of any of Statements A33 to A36, wherein the extensions are sized and positioned to engage the exterior edges against the mattress.

A38. The patient isolation device of any of Statements A33 to A37, wherein the extensions are sized and positioned to engage the interior surface against the mattress.

A39. The patient isolation device of any of Statements A33 to A38, wherein the extensions are sized and positioned to engage the lower surfaces against the mattress.

A40. The patient isolation device of any of Statements A32 to A39, wherein the cover is translucent.

A41. The patient isolation device of any of Statements A32 to A40, further comprising a support Structure supporting the cover.

A42. The patient isolation device of Statement A41, wherein the support structure comprises tubes.

A43. The patient isolation device of Statement A42, wherein at least some of the tubes are arc-shaped.

A44. The patient isolation device of any of Statements A42 to A43, wherein at least some of the tubes are mateable with each other to form the support structure.

A45. The patient isolation device of Statement A32, further comprising a head-piece enclosing a head-end of the cover.

A46. The patient isolation device of Statement A45, wherein the head-piece comprises a translucent material.

A47. The patient isolation device of any of Statements A45 to A46, further comprising a head-piece extension extending from the head-piece configured to be disposed between the mattress and the hospital bed.

A48. The patient isolation device of Statement A47, wherein the head-piece extension is flexible and configured to have a biased resting state pointing generally toward the foot-piece.

A49. The patient isolation device of any of Statements A47 to A48, wherein the head-piece extension is sized and positioned to pull at least some of the interior edges against the mattress.

A50. The patient isolation device of any of Statements A47 to A49, wherein the head-piece extension is sized and positioned to pull the exterior edges against the mattress.

A51. The patient isolation device of any of Statements A47 to A50, wherein the head-piece extension is sized and positioned to pull the interior surface against the mattress.

A52. The patient isolation device of any of Statements A47 to A51, wherein the head-piece extension is sized and positioned to pull the lower surfaces against the mattress.

A53. The patient isolation device of any of Statements A32 to A52, further comprising a foot-piece enclosing a foot-end of the cover.

A54. The patient isolation device of Statement A53, wherein the foot-piece comprises a translucent material.

A55. The patient isolation device of any of Statements A53 to A54, further comprising a foot-piece extension extending from the foot-piece configured to be disposed between the mattress and the hospital bed.

A56. The patient isolation device of Statement A55, wherein the foot-piece extension is flexible and configured to have a biased resting state pointing generally toward the head-piece.

A57. The patient isolation device of any of Statements A55 to A56, wherein the foot-piece extension is sized and positioned to pull the interior edges against the mattress.

A58. The patient isolation device of any of Statements A55 to A57, wherein the foot-piece extension is sized and positioned to pull the exterior edges against the mattress.

A59. The patient isolation device of any of Statements A55 to A58, wherein the foot-piece extension is sized and positioned to pull the interior surface against the mattress.

A60. The patient isolation device of any of Statements A55 to A59, wherein the foot-piece extension is sized and positioned to pull the lower surfaces against the mattress.

A61. The patient isolation device of any of Statements A32 to A60, further comprising an access port provided in at least one of the cover, a head-piece enclosing a head-end of the cover, or a foot-piece enclosing a foot-end of the cover.

A62. The patient isolation device of Statement A61, wherein the access port is configured to receive a replaceable sleeve.

REFERENCE NUMBERS

1 cover/patient cover
2 mattress
3 hospital bed
4 patient
5 ASC
6 extension
7 support structure
8 straight section
9 angle joint
10 corner joint
11 head-piece
12 foot-piece
13 head-piece—ASC connection
14 foot-piece—ASC connection
15 head-piece extension
16 foot-piece extension
17 tee joint
18 elbow joint
19 access port
20 flexible sleeve
20*s* small flexible sleeve
21 sealable opening
22 tubing
23 seal cover
24 medical equipment
25 first lower surface
25A first lower surface interior edge
25B first lower surface exterior edge
26 second lower surface
26A second lower surface interior edge
26B second lower surface exterior edge
27 exterior surface
28 interior surface
29 support
30 patient space
31 lower edge of head-piece
32 lower edge of foot-piece
33 removable flexible sleeve panel
34 removable flexible sleeve panel
37 lower panel portion
40 top panel portion
43 middle panel portion
50 base portion
55A fastener side
55B fastener side
60 fabric strip
63A fastener portion
63B fastener portion
65A mating portion of fastener
65B mating portion of fastener
70 distal end
73 tab Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A patient isolation device, comprising:
a cover having:
(a) a first lower surface;
(b) a second lower surface;
(c) a translucent interior surface extending between the lower surfaces;
(d) a translucent exterior surface extending between the lower surfaces; and
wherein at least a portion of the interior surface is arc-shaped and the interior surface at least partially defines a patient space within which a patient may be positioned; and
wherein the exterior surface is substantially parallel to the interior surface; and
one or more extensions configured to be disposed between a mattress and a hospital bed, thereby fixing a position of the cover relative to the mattress, each extension extending from at least one of the following:
the first lower surface;
the interior surface proximate to the first lower surface;
the exterior surface proximate to the first lower surface;
the second lower surface;
the interior surface proximate to the second lower surface; and
the exterior surface proximate to the second lower surface;
wherein at least one of the extensions is configured to facilitate at least a portion of the mattress being compressed toward the cover, thereby inhibiting passage of an infectious agent between the mattress and the cover.

2. The patient isolation device of claim 1, further comprising a support structure supporting the cover, wherein the support structure comprises tubes, and at least some of the tubes are arc-shaped, and at least some of the tubes are mateable with each other to form the support structure.

3. The patient isolation device of claim 1, wherein each extension has a top surface substantially flush with one or more of the lower surfaces of the cover.

4. The patient isolation device of claim 1, wherein the one or more extensions are sized and positioned to facilitate pressing the lower surfaces toward the mattress.

5. The patient isolation device of claim 1, wherein the one or more extensions are sized and positioned to facilitate pressing a portion of the interior surface toward the mattress.

6. The patient isolation device of claim 1, further comprising:
a head-piece enclosing a head-end of the cover, and
a head-piece extension extending from the head-piece and configured to be disposed between the mattress and the hospital bed; and the head-piece extension is flexible and configured to have a biased resting state pointing generally toward a foot-piece.

7. The patient isolation device of claim 6, wherein the head-piece extension is sized and positioned to facilitate pressing a lower surface of the head-piece toward the mattress, thereby inhibiting the passage of an infectious agent between the mattress and the head-piece.

8. The patient isolation device of claim 6, wherein the head-piece extension is sized and positioned to facilitate pressing a portion of the interior surface toward the mattress.

9. The patient isolation device of claim 1, further comprising:

a foot-piece enclosing a foot-end of the cover;

a foot-piece extension extending from the foot-piece and configured to be disposed between the mattress and the hospital bed; and the foot-piece extension is flexible and configured to have a biased resting state pointing generally toward the head-piece.

10. The patient isolation device of claim 9, wherein the foot-piece extension is sized and positioned to facilitate pressing a lower surface of the foot-piece toward the mattress, thereby inhibiting the passage of an infectious agent between the mattress and the foot-piece.

11. The patient isolation device of claim 9, wherein the foot-piece extension is sized and positioned to facilitate pressing a portion of the interior surface toward the mattress.

12. The patient isolation device of claim 1, further comprising an access port provided in at least one of the cover, a head-piece enclosing a head-end of the cover, or a foot-piece enclosing a foot-end of the cover.

13. The patient isolation device of claim 12, wherein the access port is configured to receive a replaceable sleeve.

14. A patient isolation device, comprising:

a cover having;

(a) a first lower surface;

(b) a second lower surface;

(c) a translucent interior surface extending between the lower surfaces;

(d) a translucent exterior surface extending between the lower surfaces; and wherein at least a portion of the interior surface is arc-shaped and the interior surface at least partially defines a patient space within which a patient may be positioned; and wherein the exterior surface is substantially parallel to the interior surface; and one or more extensions configured to be disposed between a mattress and a hospital bed, thereby fixing a position of the cover relative to the mattress, each extension extending from at least one of the following:

the first lower surface;

the interior surface proximate to the first lower surface;

the exterior surface proximate to the first lower surface;

the second lower surface;

the interior surface proximate to the second lower surface; and the exterior surface proximate to the second lower surface;

wherein the extensions are sized and positioned to facilitate pressing the lower surfaces toward the mattress, thereby inhibiting passage of an infectious agent between the mattress and the cover.

15. The patient isolation device of claim 14, further comprising a support structure supporting the cover, wherein the support structure comprises tubes, and at least some of the tubes are arc-shaped, and at least some of the tubes are mateable with each other to form the support structure.

16. The patient isolation device of claim 14, wherein each extension has a top surface substantially flush with one or more of the lower surfaces of the cover.

17. The patient isolation device of claim 14, wherein the one or more extensions are sized and positioned to facilitate pressing a portion of the interior surface toward the mattress.

18. The patient isolation device of claim 14, further comprising:

a head-piece enclosing a head-end of the cover, and a head-piece extension extending from the head-piece and configured to be disposed between the mattress and the hospital bed; and the head-piece extension is flexible and configured to have a biased resting state pointing generally toward a foot-piece.

19. The patient isolation device of claim 18, wherein the head-piece extension is sized and positioned to facilitate pressing a lower surface of the head-piece toward the mattress.

20. The patient isolation device of claim 18, wherein the head-piece extension Is sized and positioned to facilitate pressing a portion of the interior surface toward the mattress.

21. The patient isolation device of claim 14, further comprising:

a foot-piece enclosing a foot-end of the cover;

a foot-piece extension extending from the foot-piece and configured to be disposed between the mattress and the hospital bed; and the foot-piece extension is flexible and configured to have a biased resting state pointing generally toward the head-piece.

22. The patient isolation device of claim 21, wherein the foot-piece extension is sized and positioned to facilitate pressing a lower surface of the foot-piece toward the mattress.

23. The patient isolation device of claim 21, wherein the foot-piece extension is sized and positioned to facilitate pressing a portion of the interior surface toward the mattress.

24. The patient isolation device of claim 14, further comprising an access port provided in at least one of the cover, a head-piece enclosing a head-end of the cover, or a foot-piece enclosing a foot-end of the cover.

25. The patient isolation device of claim 24, wherein the access port is configured to receive a replaceable sleeve.

* * * * *